Oct. 24, 1967     C. L. CUNNINGHAM     3,348,321
WORLD-WIDE TIME INDICATOR
Filed Jan. 6, 1966     3 Sheets-Sheet 1
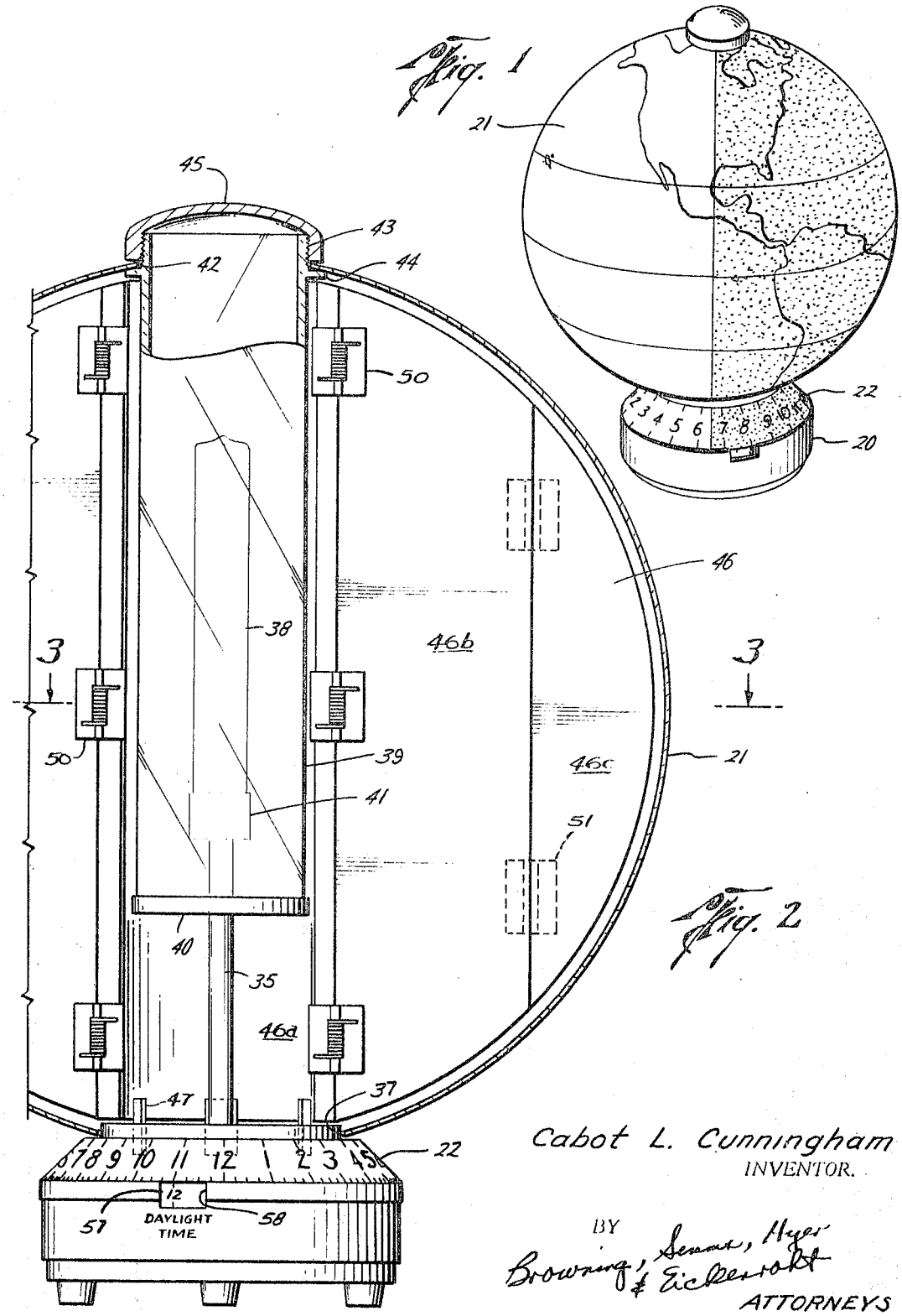
Cabot L. Cunningham
INVENTOR.
BY Browning, Sermas, Hyer & Eickenroht
ATTORNEYS Oct. 24, 1967

C. L. CUNNINGHAM 3,348,321

WORLD-WIDE TIME INDICATOR

Filed Jan. 6, 1966

Cabot L. Cunningham
INVENTOR.

BY Browning, Simms, Hyer & Eickerroht
ATTORNEYS

Oct. 24, 1967   C. L. CUNNINGHAM   3,348,321
WORLD-WIDE TIME INDICATOR
Filed Jan. 6, 1966   3 Sheets-Sheet 3
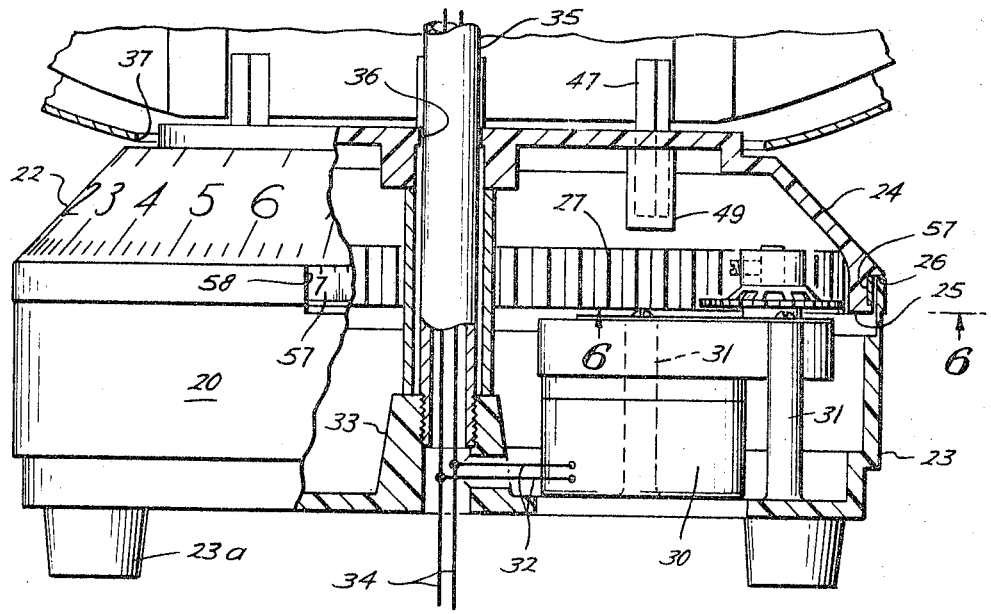
Fig. 5
Fig. 6
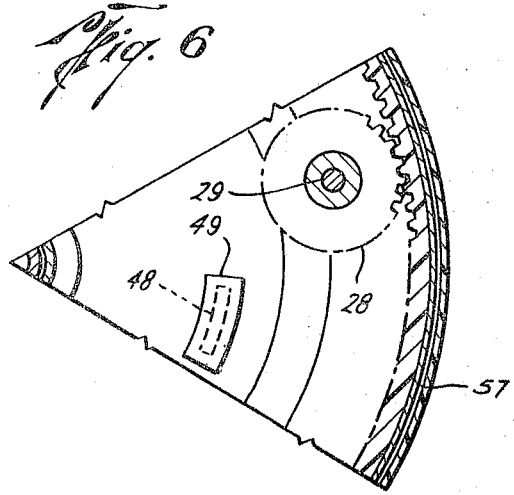
Fig. 8
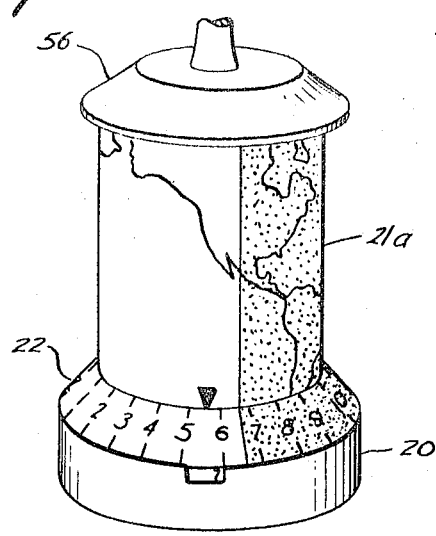
Cabot L. Cunningham
INVENTOR.
BY Browning, Simms, Hyer & Eckersolt
ATTORNEYS

# United States Patent Office 3,348,321
Patented Oct. 24, 1967

3,348,321
WORLD-WIDE TIME INDICATOR
Cabot L. Cunningham, Box 22,
Red Mountain, Calif. 93558
Filed Jan. 6, 1966, Ser. No. 519,124
3 Claims. (Cl. 35—46)

This invention relates to improvements in devices for simultaneously indicating the time at any location around the world. In one of its important aspects, it relates to devices of this type having improved means for also indicating night and day conditions at any such location.

In prior devices of the general type contemplated by this invention, a globe type world map has been mounted adjacent a twenty-four time scale supported on a base, and the map and scale have been caused to rotate relatively to one another for one revolution per twenty-four hours, thereby bringing the scale into successive alignment with the different time zones about the map. In some of these prior devices, it has also been proposed to simulate day and night conditions on opposite sides of the world by means of a baffle mounted for relative rotation with the time scale and extending across one side of a light source within a translucent globe.

It is preferred, in a device of this general type, that the globe be fixed with respect to the base so as to facilitate the viewer in finding any particular location about the world. In the type of device which is also adapted to simulate night and day conditions, this of course requires that the baffle be rotated relative to the base. The light source in most devices of this latter type has been supported from a socket mounted centrally in the face of the baffle, so that the electrical lead lines may extend downwardly from the socket into the base on the night side of the globe. Although this avoids casting shadows on the daylight side of the globe, it nevertheless complicates the transmission of electrical energy from within the fixed base to the socket in the rotating baffle.

Also, these prior devices have been generally of expensive construction and difficult to assemble and repair. This has been especially true of those having an illuminated globe and requiring assembly and repair and/or replacement of the light source as well as the baffle.

An object of this invention is to provide a device of the type adapted to simulate night and day conditions in which the light source is so mounted relative to the baffle that it neither casts shadows on the globe nor complicates its electrical connections with the base.

Another object of this invention is to provide a device of the general type above described which is of inexpensive construction and which is easy to assemble and repair.

Still another object is to provide a device of this type having a light source and baffle which may be assembled and replaced and/or repaired with relative ease.

These and other objects are accomplished, in accordance with the illustrated embodiments of the invention, by a device in which a rod extends upwardly from the base to support the map body in a desired position relative to the time scale and the light source on the daylight side of the baffle. Since the rod is fixed relative to the base the electrical connection between the base and socket for the light source merely requires the extension of electrical leads along the rod, preferably within a hollow portion thereof. In one illustrated embodiment of the invention, the rod includes a light transmitting tube which surrounds the light source. In another, the light source comprises a pair of lamps, each being supported on an opposite side of the rod in a plane generally parallel to the baffle. In both cases, therefore, the light source will not cast a shadow on the daylight side of the map body.

In the drawings, wherein like reference characters are used throughout to designate like parts:

FIG. 1 is a perspective view of a device constructed in accordance with the first described embodiment of the present invention and in which the map body is a sphere or globe;

FIG. 2 is a view, partly in vertical section and partly in elevation, of the device shown in FIG. 1;

FIG. 5 is an elevational view, broken away in part, of the base, time scale, and lower end of the map body of the device shown in FIGS. 1 to 4;

FIG. 6 is a cross-sectional view of a portion of the base, as seen along broken line 6—6 of FIG. 5;

FIG. 8 is a perspective view of a device constructed in accordance with still another embodiment of the present invention in which the map body is cylindrical in shape.

Figure 3:
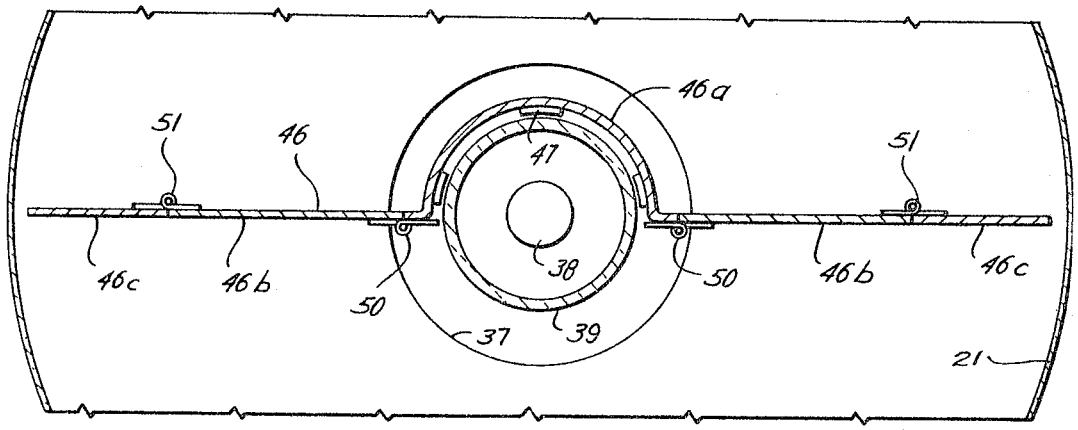
FIG. 3 is a cross-sectional view of the device of FIG. 2 as seen along broken line 3—3, and showing a baffle extending across the map body.

With reference now to the details of the above-described drawings, the device shown in FIGS. 1 to 6 comprises a cylindrical base 20, a translucent hollow map body 21 supported above the base, and a ring 22 rotatably mounted on the base intermediate it and the body 21. As can be seen from FIG. 1, North-South axis of the world map disposed about the globe 21 extends co-axially of the base as well as the ring. As also shown in this figure, a time scale bearing two successive groups of numbers indicating 1 to 12 hours surrounds the ring 22 adjacent the South end of the map so as to indicate the hour of the day in any time zone of the map.

With reference to FIG. 5, the base of each such embodiment comprises a cup-shaped hollow member 23 having pedestals 23a on its lower side for resting on any suitable horizontal surface. As also shown in this figure, the ring 22 comprises a substantially frusto-conical member 24 having a lower cylindrical extension 25 which fits within the upper end of the cup-shaped member 23 for sliding therepast during rotation of the ring with respect to the base. More particularly, the extension 25 is recessed inwardly of the lower end of member 24 to form a downwardly facing shoulder 26 which seats on and slides over the upper edge of the cup-shaped member 23.

As shown in FIGS. 5 and 6, a ring gear 27 formed about the inner surface of ring 22 is engaged by a pinion 28 rotatable on a shaft 29 within the base. The shaft is in turn supported for engagement with a gear train (not shown) which connects it with electrical motor 30 supported above an opening in the bottom of member 23, as shown in FIG. 5. More particularly, the motor and its associated parts are removably mounted in the base by suitable means, such as upwardly extending posts 31 on the bottom of the base.

Electrical lead lines extend from the motor through a side opening in a central boss 33 on the bottom of member 23 for connection with the lead lines 34 extending upwardly from a power source through the boss.

More particularly, the motor 30 is so synchronized as to rotate the ring gear 27 and thus the ring 22 one complete revolution during each twenty-four hour period. These lead lines 34 extend further upwardly through a hollow rod 35 threadedly connected at its lower end with the upper open end of the boss 33 and passing through an opening 36 in the top side of the member 24 of the ring 22. As will be described to follow, the map body 21 as well as a light source therein are supported by the rod and lead lines 34 supply the necessary power for the light source.

As shown in FIGS. 2 and 5, the lower South end of the hollow globe 21 has an opening 37 therein for fitting close to the upper edge of the ring 22. This prevents the admission of most extraneous matter to the interior of the globe, while at the same time permitting the ring to rotate freely with respect to the globe which, as above mentioned, is supported on the rod 35. Similarly, there is sufficient clearance between the rod and the opening 36 in the top of the ring to permit free rotation of the ring relative to such rod.

In the embodiment of the invention shown in FIGS. 1 to 4, the light source comprises a single lamp 38 mounted within an electrical socket 41 on the upper end of rod 35 and connected with the ends of the lead lines shown in FIG. 5. The lamp is surrounded by a light transmitting tube 39 whose lower end 40 is supported on the hollow rod beneath socket 41 and whose upper end provides an upper extension of the rod so as to support the map body 21 a desired distance above the base 20.

There is an opening 42 in the upper North end of the globe for fitting over the upper threaded end 43 of the tube and resting upon an outwardly extending flange 44 on the tube beneath the threads 43. A cap 45 is then threadedly received over the threads 43 for clamping down upon and thus fixedly holding the peripheral portion of the globe surrounding the opening 42.

As will be appreciated from the foregoing, the opening through the upper end of the tube permits the lamp 38 to be replaced, when needed, merely upon removal of cap 45. On the other hand, in the assembly of this device, the ring 22 is first lowered into place to engage gear 27 with pinion 28, the hollow rod 35 is extended through opening 36 and threadedly connected to the upper end of the boss 33 of the base, and the opening 37 through the globe 21 is lowered into place about the tube 39 and over the upper edge of the ring 22. Then, when the periphery of the globe about upper opening 42 is landed upon the flange 44, it is securely held in place by threading the cap 45 down upon the upper end of the tube 39.

It will be noted that the rod not only supports the globe from its upper end so as to permit the free rotation of the ring 22 with respect to it as well as the globe, but does so in such a way as to avoid shadows across the illuminated side of the globe. This, of course, is made possible by the disposal of the lamp 38 within the light transmitting tube portion of the supporting rod structure.

As shown in FIG. 3, a baffle 46 curves closely about the light transmitting tube 39 and then extends radially outwardly therefrom to substantially the inner periphery of the globe 21. This baffle is formed of a plate of any suitable opaque material so as to shield approximately one-half of the interior of the globe from the lamp 38. In this manner, the device is caused to simulate day and night conditions so that, as shown in FIG. 1, for example, the right-hand portion of the world would appear to be in darkness and the left-hand side to be in light. Thus, at this stage, the baffle 46 will extend along a plane extending through the North-South axis of the globe and aligned approximately with "6:30" on both sides of the time scale of the ring 22.

The baffle 46 is mounted for rotation with the ring 22 by means of arcuate pins 47 which depend from its lower end for relatively close reception within arcuate slots 48 within well 49 depending from the top of the ring 22. Thus, the baffle will move the ring past the various time zones on the interior of the globe. As shown in FIGS. 2 and 3, the outer edge of the baffle is spaced from the inner periphery of the globe so as to permit free rotation of the baffle relative thereto. The disposal of such outer edge close to the interior of the globe will provide a more well defined line of demarcation between night and day conditions about the globe. Conversely, it is possible to simulate conditions of semi-darkness by spacing the outer ends of the baffle still further from the periphery of the globe, thus providing a dawn and dusk appearance.

As also shown in FIGS. 2 and 3, the baffle is made up of a central arcuate section 46a on which the pins 47 are carried and which is closely disposed about one side of the light transmitting tube 39. The opposite out-turned ends of baffle portion 46a are hingedly connected at 50 to intermediate baffle portions 46b, which in turn are hingedly connected at 51 to end baffle portions 46c curved to generally the inner surface of the globe. More particularly, these sections are so formed that the intermediate and outer baffle portions may be folded with respect to one another as well as with respect to the central portion 46a so as to bring them all within the confines of the opening 37 in the South end of the globe. In this manner, and as described above in connection with the assembly of this device, the opening 37 can be moved downwardly over the baffle as well as the tube 39. At the same time, in the disassembly of the device for any reason, the baffle may be folded in the position shown in FIG. 4 to permit the globe to be lifted therefrom.

Figure 7:
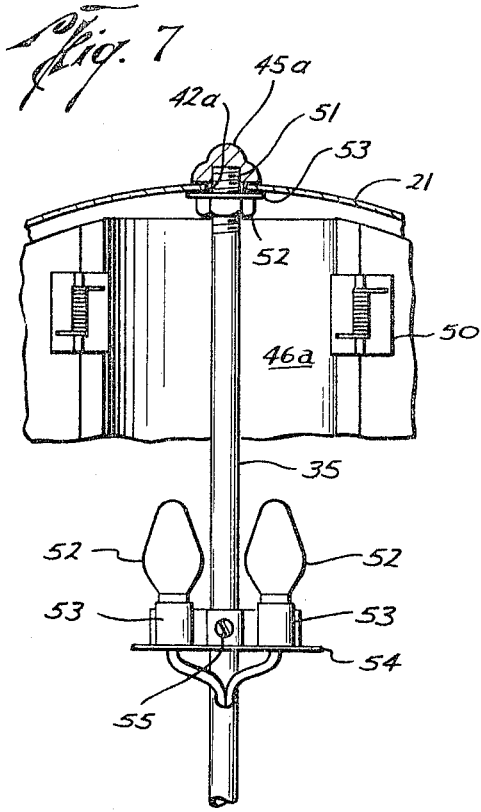
FIG. 7 is a vertical sectional view of a portion of a device constructed in accordance with the second described embodiment of the invention and in which the map body is also a sphere or globe.
Figure 4:
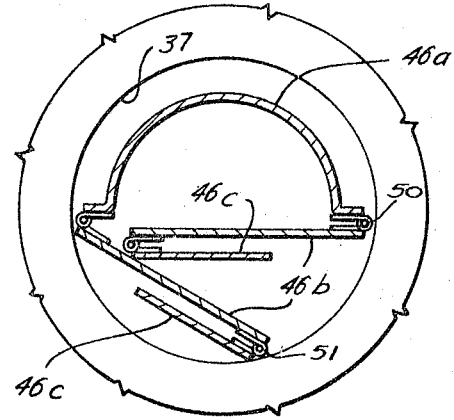
FIG. 4 is a view similar to FIG. 3, but in which the baffle has been folded up into a position to permit it to pass through an opening in the bottom end of the map body.

The embodiment of the invention shown in part in FIG. 7 is identical of the embodiment above-described, except for the construction of the light source and the manner of supporting it and the globe 21. Thus, in this second embodiment, the hollow rod 35 extends all the way through the globe to an upper threaded end 51. As shown in FIG. 7, a nut 52 on the threaded end 51 supports a washer 53 upon which the periphery about a reduced opening 42a within the North end of the globe may be supported. A cap 45a is then threaded down over the upper end 51 to tightly clamp such periphery of the globe down upon the washer 53.

This construction enables a larger map area to show upon the upper North end of the globe 21. On the other hand, it does not permit replacement of the light source through the upper end of the globe, as is possible with the removal of the cap 45 of the first-described embodiment.

In the device of FIG. 7, the light source comprises a pair of lamps 52 each mounted on an electrical socket 53 carried on a bracket 54 fixed to an intermediate portion of the hollow rod 35 by means of set screw 55 or the like. The upper ends of lead lines 34 extend through a hole in the rod for connection with the sockets. Preferably, the sockets are wired in series, so that even though it is more difficult to replace the lamps, the need for doing so is only a fraction of that in the case of the embodiment shown in FIGS. 1 to 6.

The lamps 52 are disposed at opposite sides of the hollow tube 35. Thus, the rod 35 will not cast a shadow on the illuminated side of the globe, as it would do if there were only a single lamp.

In the embodiment of the invention shown in FIG. 8, the hollow translucent map body 21a is of cylindrical rather than spherical shape. Thus, the map thereon is a Mercator projection of the world map. Since its upper or North end provides a broader base, a pedestal 56 for a lamp fixture or the like may be disposed thereover.

In each of the embodiments of the invention, there is a further auxiliary ring 57 mounted about the time scale ring 22, as best shown in FIGS. 5 and 6. This auxiliary ring is free to rotate relative to the ring 22 so that an identical twenty-four hour time scale thereon may be adjusted with respect to the time scale of the ring 22 so as to indicate daylight saving time. For this purpose, a portion of the upper end of the cup-shaped member 23 is removed, as shown at 58, to permit a portion of the auxiliary ring 57 to be seen adjacent the main time scale of the ring 22. Thus, as shown in FIG. 2 as for example, the auxiliary ring has been moved into a position to illustrate daylight saving time of twelve o'clock relative to the standard time of eleven o'clock shown on the main time scale.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A world-wide time indicator, comprising a base, a hollow rod fixedly secured to the base and extending upwardly therefrom, an electrical socket on the upper end of the rod to receive a lamp, electrical lead lines extending through the rod between the socket and the base, a light-transmitting tube having an open upper end and supported on the rod in surrounding relation to the socket, a translucent hollow body having a map of the world disposed thereabout, the upper end of the map body also being open for fitting about the upper end of the tube, and means on said upper end of the tube supporting the map body in surrounding relation thereto when it is so fitted, a cap to cover the upper end of the tube, whereby the lamp may be replaced after removing the cap without removing said map body, a ring rotatably mounted on the base and having a twenty-four hour time scale thereabout adjacent the map, and means for rotating the ring relative to the base at one revolution per twenty-four hour period.

2. As in claim 1, including means on the cap for removably connecting it to the tube to hold the map body on said supporting means.

3. As in claim 1, including a baffle disposed within the hollow body on one side of the hollow tube and having its outer edges extending close to the interior of the body for shielding approximately one side of the body interior from the lamp so as to simulate night and day conditions about the world, and means connecting the baffle to the ring so that the baffle rotates with the ring.

References Cited

UNITED STATES PATENTS

| | | | |
|---|---|---|---|
| 762,261 | 6/1904 | Strasburg | 58—44 X |
| 1,515,135 | 1/1924 | Alexander | 35—46 |
| 1,925,288 | 9/1933 | Spranger | 58—43 X |
| 2,036,046 | 3/1936 | Harrison | 58—44 |
| 2,099,518 | 11/1937 | Hazlett | 35—46 X |
| 2,200,821 | 5/1940 | Colberg | 35—46 |
| 2,300,621 | 11/1942 | Dupler | 35—46 X |
| 2,513,465 | 7/1950 | Fisk | 35—46 X |
| 3,002,337 | 10/1961 | Smith | 58—44 |

FOREIGN PATENTS

| | | |
|---|---|---|
| 1,333,928 | 6/1963 | France. |

JEROME SCHNALL, *Primary Examiner.*